United States Patent
Gaines et al.

(10) Patent No.: US 7,481,062 B2
(45) Date of Patent: Jan. 27, 2009

(54) MORE ELECTRIC AIRCRAFT STARTER-GENERATOR MULTI-SPEED TRANSMISSION SYSTEM

(75) Inventors: Louie T. Gaines, Phoenix, AZ (US); Peter J. Auer, Chandler, AZ (US); Glenn H. Lane, Chandler, AZ (US); James A. Wissinger, Carefree, AZ (US)

(73) Assignee: Honeywell International Inc., Morristown, NJ (US)

( * ) Notice: Subject to any disclaimer, the term of this patent is extended or adjusted under 35 U.S.C. 154(b) by 552 days.

(21) Appl. No.: 11/323,692

(22) Filed: Dec. 30, 2005

(65) Prior Publication Data

US 2007/0151258 A1 Jul. 5, 2007

(51) Int. Cl.
*F02C 3/10* (2006.01)
(52) U.S. Cl. .............................. 60/792; 60/793; 60/802
(58) Field of Classification Search ................... 60/792, 60/793, 802
See application file for complete search history.

(56) References Cited

U.S. PATENT DOCUMENTS

| | | | |
|---|---|---|---|
| 3,416,309 A | 12/1968 | Elmes et al. | |
| 3,786,696 A | 1/1974 | Aleem | |
| 3,965,673 A | 6/1976 | Friedrich | |
| 4,109,743 A * | 8/1978 | Brusaglino et al. | 180/65.4 |
| 4,403,292 A | 9/1983 | Ejzak et al. | |
| 4,461,143 A | 7/1984 | Shutt | |
| 4,572,961 A | 2/1986 | Borger | |
| 4,684,081 A | 8/1987 | Cronin | |
| 4,694,187 A | 9/1987 | Baker | |
| 4,708,030 A | 11/1987 | Cordner | |
| 4,724,331 A | 2/1988 | Nordlund | |
| 4,908,565 A | 3/1990 | Cook et al. | |
| 4,912,921 A | 4/1990 | Rice et al. | |
| 4,967,096 A | 10/1990 | Diemer et al. | |
| 5,175,109 A * | 12/1992 | Sakata et al. | 436/17 |
| 5,309,029 A | 5/1994 | Gregory et al. | |
| 5,435,125 A | 7/1995 | Telakowski | |
| 5,694,765 A | 12/1997 | Hield et al. | |
| 5,783,932 A | 7/1998 | Namba et al. | |
| 5,845,483 A | 12/1998 | Petrowicz | |
| 5,899,411 A | 5/1999 | Latos et al. | |
| 6,124,646 A | 9/2000 | Artinian et al. | |
| 6,142,418 A | 11/2000 | Weber et al. | |
| 6,242,881 B1 | 6/2001 | Giordano | |
| 6,344,700 B1 | 2/2002 | Eisenhauer et al. | |
| 6,467,725 B1 | 10/2002 | Coles et al. | |
| 6,527,660 B1 | 3/2003 | Sugden | |
| 6,561,940 B2 | 5/2003 | Goi et al. | |
| 6,606,864 B2 | 8/2003 | MacKay | |
| 6,631,703 B2 | 10/2003 | Tonnqvist et al. | |
| 6,672,049 B2 | 1/2004 | Franchet et al. | |
| 6,825,640 B1 | 11/2004 | Hill et al. | |
| 6,838,778 B1 | 1/2005 | Kandil et al. | |

(Continued)

*Primary Examiner*—William H Rodríguez
*Assistant Examiner*—Phutthiwat Wongwian
(74) *Attorney, Agent, or Firm*—Ingrassia Fisher & Lorenz, P.C.

(57) ABSTRACT

A turbofan gas turbine propulsion engine includes a multi-speed transmission between the high pressure and low pressure turbines and associated high pressure and low pressure starter-generators. The multi-speed transmission reduces the operating speed range from the low pressure turbine to its associated starter-generator, and is configurable to allow the starter-generator associated with the low pressure turbine to supply starting torque to the engine.

20 Claims, 2 Drawing Sheets

U.S. PATENT DOCUMENTS 6,838,779 B1 1/2005 Kandil et al.
6,895,741 B2 5/2005 Rago et al.
6,931,856 B2 8/2005 Belokon et al.
2005/0188704 A1* 9/2005 Butt ............................ 60/778
2006/0010875 A1* 1/2006 Mahoney et al. .............. 60/772
2006/0272313 A1* 12/2006 Eick et al. .................. 60/39.63

* cited by examiner

MORE ELECTRIC AIRCRAFT STARTER-GENERATOR MULTI-SPEED TRANSMISSION SYSTEM

TECHNICAL FIELD

The present invention relates to turbofan gas turbine propulsion engines and, more particularly, to a system for extracting additional power from the low pressure turbine in a turbofan gas turbine propulsion engine, and allowing a starter-generator that is normally driven by a low pressure turbine to supply starting torque to the turbofan gas turbine propulsion engine.

BACKGROUND

Aircraft main propulsion engines not only generate propulsion thrust for the aircraft, but in many instances may also be used to drive various other rotating components such as, for example, generators, compressors, and pumps, to thereby supply electrical, pneumatic, and/or hydraulic power. In multi-spool turbofan gas turbine engines, this is accomplished via a plurality of turbines. In particular, each turbine receives a flow of combusted gas from a combustor and, in response, generates shaft power that is used to drive one or more of these rotational components, via a plurality of concentric shafts. Thus, a portion of the shaft power that each turbine generates is used to provide propulsion thrust, while another portion of the generated shaft power is extracted and used to drive these other rotational components.

In recent years, aircraft architectures are being provided that rely more and more on electrical power, and less on pneumatic (e.g., bleed air) and/or hydraulic power. In such architectures, shaft power extraction demand can increase significantly. For example, shaft power extraction demand can be as much as 200% to 300% more than traditional solutions such as bleed air and/or hydraulic power. Although these architectures are generally safe, robust, and reliable, the architectures may suffer certain drawbacks. For example, high shaft power extraction demand can negatively impact engine compressor surge margin. A relatively straightforward technique to mitigate this drawback is to increase the engine speed and bleed during high shaft power extraction demands. This solution, however, can increase both the fuel burn rate and the residual thrust that the engine generates, most notably during flight and ground idle conditions, as well as during transients. The increased residual thrust can result in increased brake usage on the ground and/or increased airbrake usage in flight.

In order to meet the above-described needs of the more electric aircraft, architectures have been proposed that use the low pressure turbine to drive one or more generators. However, because the low pressure turbine operational speed range is, in many instances, significantly greater than the operational speed range of the high pressure turbine, the operating speed range from the low pressure turbine to an associated generator may need to be reduced. Moreover, it is further desirable that the low pressure turbine-driven generators, if included, are operable as starter-generators that can be used to provide starting torque to the gas turbine engine, if needed or desired.

Hence, there is a need for a system for a more electric aircraft architecture that improves the surge margin of the propulsion engine compressors and/or improves engine operability and/or, at least during high power extraction demands, reduces fuel burn rate and/or reduces the residual thrust that the engines generate, and/or reduces the operating speed range from the low pressure turbine to an associated generator and/or allows a starter-generator that is normally driven by the low pressure turbine to supply starting torque to the engine. The present invention addresses one or more of these needs.

BRIEF SUMMARY

The present invention provides a multi-speed transmission between the high pressure and low pressure turbines in a multi-spool gas turbine engine that reduces the operating speed range from the low pressure turbine to an associated starter-generator, and that allows a starter-generator that is normally driven by the low pressure turbine to supply starting torque to the engine.

In one embodiment, and by way of example only, a multi-spool gas turbine engine includes a gas turbine engine, a high pressure starter-generator, a first clutch assembly, a multi-speed gear assembly, a low pressure starter-generator, and a second clutch. The gas turbine engine includes at least a high pressure turbine and a low pressure turbine, each of which is adapted to receive a flow of combusted gas and is operable, upon receipt thereof, to generate rotational energy. The high pressure starter-generator is coupled to the high pressure turbine and is configured to selectively operate in either a generator mode, in which at least a portion of the rotational energy generated by the high pressure turbine is converted to electrical energy or a motor mode, in which electrical energy is converted to rotational energy and supplied to the high pressure turbine. The first clutch assembly is movable between an engaged position and a disengaged position. The multi-speed gear assembly is coupled to the low pressure turbine and to the first clutch assembly and is operable, upon receipt of the rotational energy and in dependence on the position of the first clutch assembly, to supply a rotational drive force at a rotational speed that varies over one of a plurality of rotational speed ranges. The low pressure starter-generator is coupled to the multi-speed gear assembly and is configured to selectively operate in either a generator mode, in which the rotational drive force supplied from the multi-speed gear assembly is converted to electrical energy or a motor mode, in which electrical energy is converted to rotational energy. The second clutch assembly is movable between an engaged position, in which the low pressure starter-generator is coupled to the high pressure turbine, and a disengaged position, in which the low pressure starter-generator is decoupled from the high pressure turbine.

Other independent features and advantages of the preferred system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the following detailed description is merely exemplary in nature and is not intended to limit the invention or the application and uses of the invention. In this regard, it is to be additionally appreciated that the described embodiment is not limited to use in conjunction with a particular type of turbine engine. Hence, although the present embodiment is, for convenience of explanation, depicted and described as being implemented in a multi-spool gas turbine jet engine, it will be appreciated that it can be implemented in various other types of turbines, and in various other systems and environments. Furthermore, there is no intention to be bound by any theory presented in the preceding background or the following detailed description.

Figure 1:
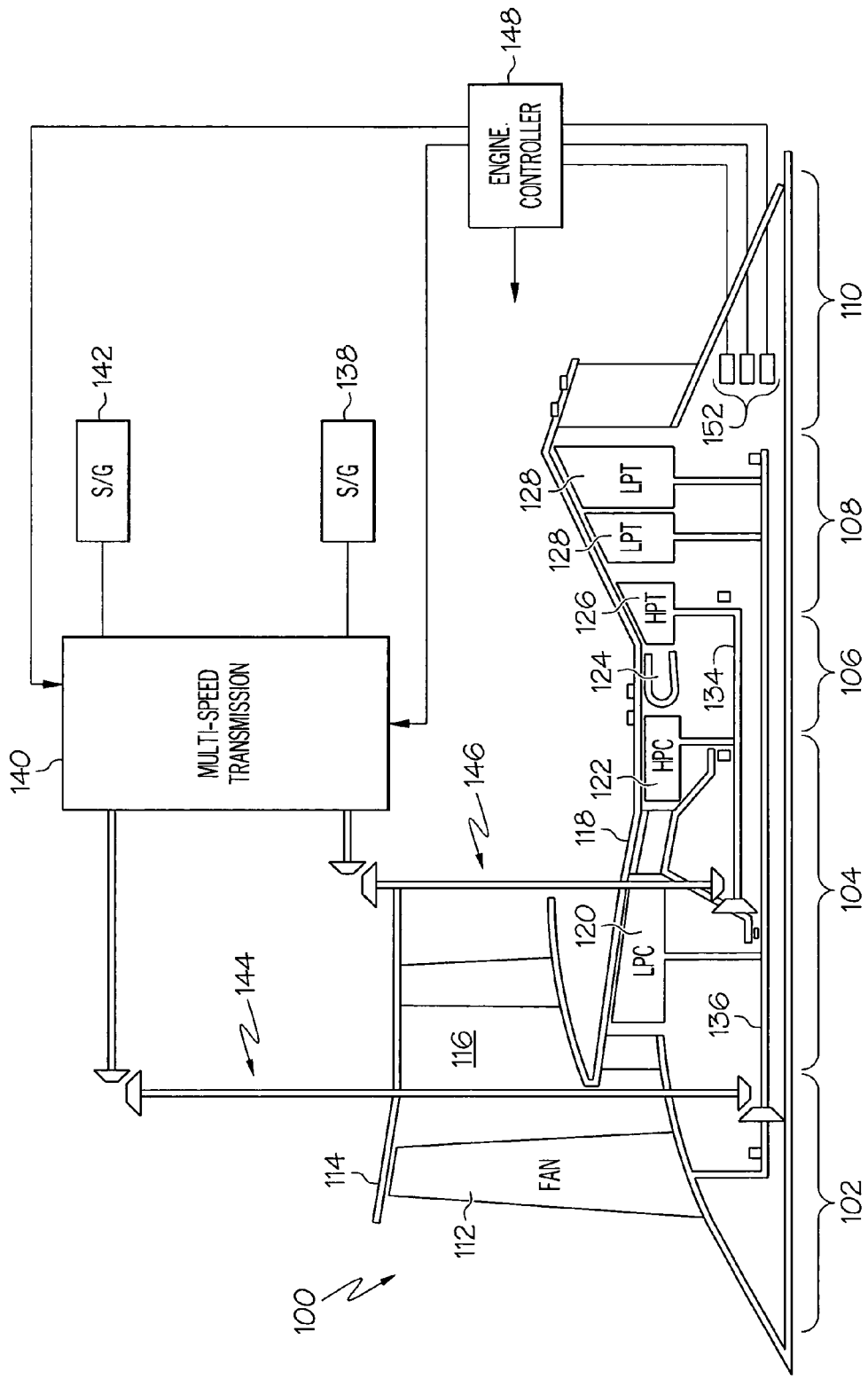
FIG. 1 is a functional schematic representation of an exemplary turbo-fan gas turbine engine that includes a multi-speed transmission according to an exemplary embodiment of the present invention.

A simplified representation of an exemplary multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 (shown only partially in FIG. 1) disposed between the fan case 114 and an engine case 118, and provides a forward thrust. The remaining fraction of air exhausted from the fan 112 is directed into the compressor section 104.

The compressor section 104 includes two compressors, a low pressure compressor 120, and a high pressure compressor 122. The low pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a combustor 124, a plurality of non-illustrated fuel injectors, and one or more non-illustrated igniters, the high pressure air is mixed with fuel and combusted. The combusted air is then directed into the turbine section 108.

The turbine section 108 includes two turbines, a high pressure turbine 126 and a low pressure turbine 128, disposed in axial flow series in the engine case 118. The combusted air from the combustion section 106 expands through each turbine 126, 128, causing each to rotate. The air is then exhausted through a propulsion nozzle disposed in the exhaust section 110, providing addition forward thrust. As the turbines rotate, each drives equipment in the engine 100 via concentrically disposed shafts or spools. For example, the low pressure turbine 128 drives the fan 112 and the low pressure compressor 120 via a low pressure spool 136, and the high pressure turbine 126 drives the high pressure compressor 122 via a high pressure spool 134.

The low pressure turbine 128 and high pressure turbine 126 may additionally drive one or more other components external to the engine 100. For example, the low pressure turbine 128 drives one or more generators 138, referred to herein as low pressure generators (only one shown in FIG. 1), via a multi-speed transmission 140. Moreover, the high pressure turbine 126 drives one or more generators 142, referred to herein as high pressure generators (only one shown in FIG. 1), also via the multi-speed transmission 140. More specifically, the low pressure spool 136 and the high pressure spool 134 are coupled to the multi-speed transmission 140 via a first power take-off assembly 144 and a second power take-off assembly 146, respectively. With this arrangement, whenever the low pressure turbine 128 or the high pressure turbine 126 rotates, each supplies a drive force, via the first power take-off assembly 144 or the second power take-off assembly 146, respectively, to the multi-speed transmission 140. The multi-speed transmission 140 in turn supplies the received drive forces, at the appropriate rotational speeds, to the low pressure generator 138 or the high pressure generator 142, respectively, which in turn generate electrical power. The electrical power is supplied, for example, to the aircraft electrical distribution system (not illustrated) for use by various other systems and components.

It will be appreciated that the low pressure and high pressure generators 138, 142 may be implemented as any one of numerous types of AC or DC generators or starter-generators. However, in a preferred embodiment both are implemented as brushless AC starter-generators. A starter-generator, as is generally known, is configured to operate, when properly energized, in either a generator mode or a motor mode. In the generator mode, rotational mechanical energy is supplied to the starter-generator, and the starter-generator converts the rotational energy to electrical energy. Conversely, in the motor mode, electrical energy is supplied to the starter-generator, and the starter-generator converts the electrical energy to rotational mechanical energy, which is in turn supplied to one or more machines.

In the depicted embodiment, the engine 100 and multi-speed transmission 140 are configured such that, when the engine 100 is operating, both the low pressure starter-generator 138 and the high pressure starter-generator 142 are preferably operated in the generator mode. It will be appreciated, however, that only one of the starter-generators 138, 142 could be used to generate electrical power if needed or desired. As will be described in more detail further below, the multi-speed transmission 140 is preferably configured such that it implements a single gear ratio between the high pressure turbine 126 and the high pressure starter-generator 142, but implements a plurality of gear ratios between the low pressure turbine 128 and the low pressure starter-generator 138. Thus, in the generator mode, the high pressure starter-generator 142 is driven at a rotational speed that varies over a single speed range, whereas the low pressure starter-generator 138 is driven at a rotational speed that varies over one of a plurality of rotational speed ranges.

The engine 100 and multi-speed transmission 140 are further configured such that either the low pressure starter-generator 138 or the high pressure starter-generator 142 is used, in the motor mode, to start the engine 100. Preferably, the high pressure starter-generator 142 is used to rotate the high pressure turbine 126 during engine 100 starting operations. However, the engine 100 and multi-speed transmission 140 are also configured such that the low pressure starter-generator 142 could instead be used to rotate the high pressure turbine 126 during engine 100 starting operations.

The overall operation of the engine 100, the low pressure and high pressure starter-generators 138, 142, and the multi-speed transmission 140, are controlled via an engine controller 148. The engine controller 148, as is generally known, is used to control the output power of the engine 100 by, for example, controlling fuel flow rate to the engine 100, as well as controlling airflow through the engine 100. In the depicted embodiment, the engine controller 148 receives signals from a plurality of sensors 152 that are disposed at various locations on and within the engine 100. The sensors 152 are used to sense various physical parameters associated with the engine 100 such as, for example, various temperatures, engine speed, and air flow, and supply signals representative of the sensed parameters to the engine controller 148. The engine controller 148 processes the signals received from the sensors 152 and, among other things, supplies various commands to the engine 100, the low pressure and high pressure starter-generators 138, 142 (or non-illustrated starter-generator control units), and the multi-speed transmission 140, to control overall engine operation. It will be appreciated that the engine controller 148 may be any one of numerous types of engine controllers such as, for example, a FADEC (Full Authority Digital Engine Controller) or an EEC (Electronic Engine Controller).

Figure 2:
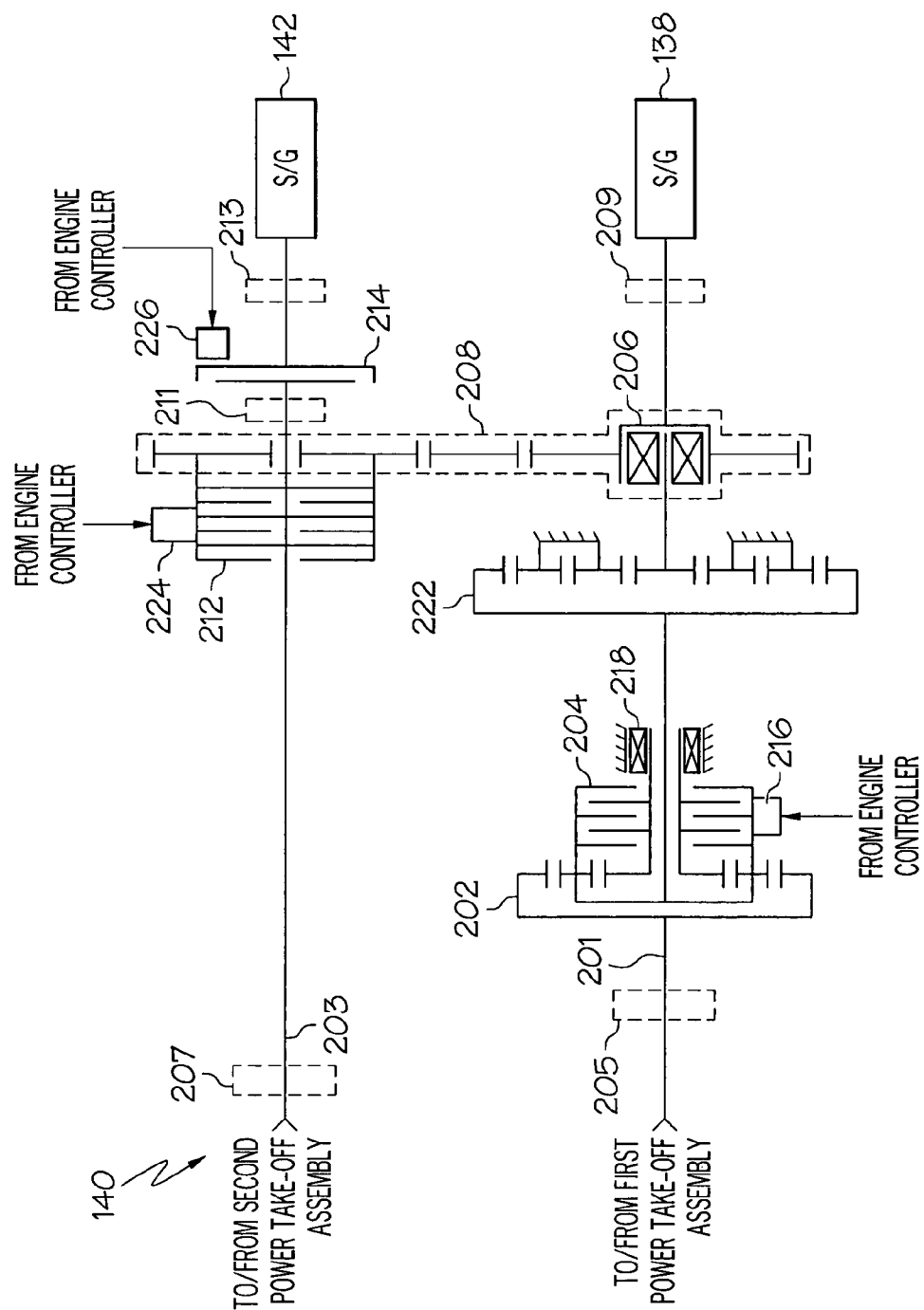
FIG. 2 is a more detailed functional schematic representation of the turbo-fan gas turbine engine depicting the multi-speed transmission of FIG. 1 in more detail.

Turning now to FIG. 2, a more detailed functional schematic representation of the multi-speed transmission 140 is depicted and will be described in more detail. The multi-speed transmission 140 includes a multi-speed gear assembly 202, a first clutch assembly 204, an overrunning sprag clutch 206, an interconnection gear assembly 208, a second clutch assembly 212, and a decoupler 214. The multi-speed gear assembly 202 is coupled to the first power take-off assembly 144, via a low pressure input shaft 201, and thus receives at least a portion of the rotational energy generated by the low pressure turbine 128. The multi-speed gear assembly 202 is configured to implement a plurality of rotational drive speed ratios. Thus, for a given low pressure turbine 128 rotational speed, the multi-speed gear assembly 202 is configured to supply a rotational drive force to the low pressure starter-generator 138 at one of a plurality of rotational drive speeds. As FIG. 2 also depicts in phantom, one or more speed increasing or decreasing gears 205, such as bevel gears, may be coupled between the first power take-off assembly 144 and the multi-speed gear assembly 202, if needed or desired, and one or more speed increasing or decreasing gears 207, such as bevel gears may be coupled between the second power take-off assembly 146 and the second clutch assembly 212, if needed or desired.

It will be appreciated that the multi-speed gear assembly 202 may be implemented as any one of numerous types of gear assemblies, and may be configured to implement any one of numerous rotational drive speed ratios to provide a desired or suitable low pressure starter-generator 138 speed range over the speed ratio of the low pressure turbine 128. In the depicted embodiment, however, the multi-speed gear assembly 202 is implemented as a planetary gear set that implements two rotational drive speed ratios, to thereby drive the low pressure starter-generator 138 over two speed ranges. The particular rotational drive speed ratio that the multi-speed gear assembly 202 implements, and thus the particular speed range over which the low pressure starter-generator 138 is driven, is controlled via the first clutch assembly 204.

The first clutch assembly 204 includes a first clutch actuator 216 that is responsive to clutch actuator commands to move the first clutch assembly 204 between an engaged position and a disengaged. In the depicted embodiment, the clutch actuation commands are supplied to the first clutch actuator 216 from the engine controller 148. It will be appreciated, however, that the clutch actuation commands could be supplied from a separate control circuit. Moreover, the first clutch actuator 216 and associated clutch actuation commands could be implemented according to any one of numerous configurations and signal paradigms. In the depicted embodiment, however, the first clutch actuator 216 is configured to move the first clutch assembly 204 to the disengaged position when the clutch actuator 216 is de-energized. With this configuration, the first clutch assembly 204 automatically moves to the disengaged position if power supplied thereto is lost.

No matter the particular implementation of the first clutch assembly 204, the first clutch actuator 216, and the associated clutch actuation commands, the depicted embodiment is preferably implemented such that when the first clutch assembly 204 is in the engaged position, it locks one or more gears within the multi-speed gear assembly 202 to provide the multiple speed ranges. For example, in one particular embodiment, in which the multi-speed gear assembly 202 is implemented as a two speed planetary gear assembly, when the first clutch assembly 204 is in the engaged position, it locks a sun gear to a carrier, which causes the entire multi-speed gear assembly 202 to rotate. Conversely, when the first clutch assembly 204 is in the disengaged position, the sun gear is fixed via, for example, a sprag clutch 218, and a ring gear is used as the input and the carrier as an output.

As FIG. 2 also shows, the multi-speed transmission may additionally include a speed changer 222. The speed changer 222, if included, is coupled between the multi-speed gear assembly 202 and the overrunning sprag clutch 206, and provides an additional rotational speed change of the output of the multi-speed gear assembly 202. It will be appreciated that the speed changer 222 can be implemented as either a speed increaser or a speed decreaser, as needed, and, in some embodiments, be eliminated. It will additionally be appreciated that the speed changer 222, if included, may provide a speed change (increase or decrease) of any one of numerous speed magnitudes. The particular additional speed change magnitude may be chosen to provide desired rotational speed matching between the multi-speed gear assembly and the low pressure starter-generator 138.

Whether or not the speed changer 222 is included in the multi-speed transmission 140, the rotational drive force output from the multi-speed gear assembly 202 during engine 100 operations is supplied to the overrunning sprag clutch 206. The overrunning sprag clutch 206 is configured to transmit the drive force output from the multi-speed gear assembly 202 (and speed changer 222 if included) to the low pressure starter-generator 138 and the interconnection gear assembly 208. As a result, both the low pressure starter-generator 138 and the interconnection gear assembly 208 rotate. The overrunning sprag clutch 206 is additionally configured to overrun when the low pressure starter-generator 138 is operating in the motor mode and supplying a drive force thereto. As will be described in more detail below, this typically occurs when the low pressure starter-generator 138 is used to start the engine 100. In any case, when the overrunning sprag clutch 206 overruns, it disengages the low pressure starter-generator 138 from the low pressure turbine 128, and more specifically from the multi-speed gear assembly 202 (and speed changer 222 if included), but remains coupled to the interconnection gear assembly 208. Thus, the interconnection gear assembly 208 will rotate, and transmit the drive force supplied from the low pressure starter-generator 138.

Turning now to the remainder of the multi-speed transmission 140, it is seen that the second clutch assembly 212 is coupled between a high pressure input shaft 203 and the interconnection gear assembly 208, and that the decoupler 214 is coupled between the second clutch assembly 212 and the high pressure starter-generator 142. The second clutch assembly 212 is preferably configured at least similar to first clutch assembly 204, and thus includes a second clutch actuator 224 that is responsive to clutch actuator commands to move the second clutch assembly 212 between an engaged position and a disengaged. In the depicted embodiment, the clutch actuation commands to the second clutch actuator 224 are also supplied from the engine controller 148. It will be appreciated, however, that the clutch actuation commands could also be supplied from a separate control circuit. Moreover, the second clutch actuator 224 and associated clutch actuation commands could be implemented according to any one of numerous configurations and signal paradigms. In the depicted embodiment, however, the second clutch actuator 224 is configured to move the second clutch assembly 212 to the disengaged position when the clutch actuator 216 is deenergized. With this configuration, the second clutch assembly 212 automatically moves to the disengaged position if power supplied thereto is lost.

No matter the particular implementation of the second clutch assembly 212, the second clutch actuator 224, and the associated clutch actuation commands, the depicted embodiment is preferably implemented such that when the second clutch assembly 212 is in the engaged position, it locks the interconnection gear assembly 208 to the high pressure input shaft 203. Thus, it will be appreciated that the second clutch assembly 212 is normally disengaged, and is preferably moved to the engaged position only when the low pressure starter-generator 138 is used to start the engine 100.

The decoupler 214 also movable between an engaged position and a disengaged position. Preferably, the decoupler 214 is normally in the engaged position. In the engaged position, the decoupler 214 couples the second clutch assembly 212 to the high pressure starter-generator 142. Thus, during normal engine 100 operations and when the high pressure starter-generator 142 is used to start the engine 100, the high pressure starter-generator 142 is coupled to the high pressure turbine 126, via the second power take-off 146 and the high pressure spool 134. The decoupler 214 is moved to the disengaged position when the low pressure starter-generator 138 is used to start the engine 100, thus decoupling the high pressure starter-generator 142 from the second clutch assembly 212 and preventing the low pressure starter-generator 138 from driving, or attempting to drive, the high pressure starter generator 142.

It is noted that the decoupler 214 is preferably configured such that when it is moved to the disengage position, it does not reengage. It will be appreciated that the decoupler 214 may be implemented according to any one of numerous configurations in order to implement this functionality. For example, the decoupler 214 could be implemented with a mechanical device that, once the decoupler 214 is moved to the disengaged, inhibits movement of the decoupler 214 to the engaged position. Alternatively, and as shown in FIG. 2, the decoupler 214 could include a decoupler actuator 226 that is responsive to decoupler actuator commands to move the decoupler to only the disengaged position. It will be appreciated that this is merely exemplary of a preferred embodiment, and that the decoupler 214 and decoupler actuator 226 could alternatively be configured to move the decoupler 214 to both the engaged and disengaged positions.

The multi-speed transmission 140 described above is merely exemplary of a particular embodiment, and could be implemented without one or more of the gears, gear assemblies, and speed changers described above and depicted in FIG. 2, or with additional gears and gear assemblies, as needed or desired to optimize speed matching and loading. For example, as FIG. 2 additionally depicts in phantom, a speed increasing or decreasing gear assembly 209 could be disposed between the overrunning sprag clutch 206 and the low pressure starter generator 138, and/or a speed increasing or decreasing gear assembly 211 could be disposed between the interconnection gear assembly 208 and the decoupler 214, and/or a speed increasing or decreasing gear assembly 213 could be disposed between the decoupler 214 and the high pressure starter-generator 142, as needed or desired.

Having described the individual operations of the engine 100 and the multi-speed transmission 140, and the interconnections between and within each of these systems 100, 142, a brief discussion of the operation of these systems 100, 140 during normal engine 100 operation, an engine startup operation using the high pressure starter-generator 142, and an engine startup operation using the low pressure starter-generator 138 will now be provided. During normal engine 100 operations, the second clutch assembly 212 is in the disengaged position, and the decoupler 214 is in the engaged position. Thus, the high pressure turbine 126 drives the high pressure starter-generator 142, via the second power take-off assembly 146, the high pressure spool 134, and the high pressure input shaft 203, independent of the low pressure starter-generator 138. Moreover, the low pressure turbine 128 independently drives the low pressure starter-generator 138, via low pressure spool 136, the first power take-off 144, the multi-speed gear assembly 202, the speed changer 222 (if included), and the overrunning sprag clutch 206.

It is noted that, during normal engine 100 operations, when the low pressure turbine 128 is operating at a relatively low speed, the engine controller 148 commands the first clutch assembly 204 to the engaged position. In the engaged position the multi-speed gear assembly 202 operates at a first gear ratio. However, when the low pressure turbine 128 is operating at a relatively high speed, the engine controller commands the first clutch assembly 204 to the disengaged position. In the disengaged position the multi-speed gear assembly 202 operates at a second gear ratio, which is a higher, speed decreasing, gear ratio than the first gear ratio.

It will be appreciated that the specific magnitudes of the first and second gear ratios, and the low pressure turbine 128 rotational speeds at which the gear ratios are changed, may vary from engine-to-engine. In one particular exemplary embodiment, the engine 100 is configured such that the high pressure turbine 126 rotational speed ranges from 8,400 to 9,000 rpm as the low pressure turbine 128 rotational speed ranges from 800 to 3,290 rpm. With this embodiment, the engine controller 146 is configured to command the first clutch assembly 204 to the engaged position for low pressure turbine 128 rotational speeds below 1,700 rpm, and to the disengaged position for low pressure turbine 128 rotational speeds at or above 1,700 rpm. Moreover, multi-speed gear assembly 202 is configured such that the first and second speed ratios are 1:1 and 1.85:1, respectively. Thus, when the low pressure turbine 128 rotational speed is below 1,700 rpm and the first clutch assembly 204 is in the engaged position, the multi-speed gear assembly 202 provides a 1:1 gear ratio. Then, when the low pressure turbine 128 rotational speed reaches 1,700 rpm, and the engine controller 146 commands the first clutch assembly 204 to the disengaged position, the multi-speed gear assembly provides a 1.85:1 (speed decreasing) gear ratio.

Typically, the engine 100 is started up using the high pressure starter-generator 142. As such, during typical engine 100 startup operations, the second clutch assembly 212 is in the disengaged position, the decoupler 214 is in the engaged position, the high pressure starter-generator 142 is operated in the motor mode, and the low pressure starter-generator 138 is de-energized. In this configuration, the high pressure starter-generator 142 drives the high pressure turbine 126, via the second power take-off assembly 146 and high pressure spool 134, until the engine 100 is started, at which point the previously described normal engine operation is implemented.

If needed or desired, the engine 100, as previously noted, can also be started up using the low pressure starter-generator 138. During startup operations with the low pressure starter-generator 138, the second clutch 212 is in the engaged position, the decoupler 214 is in the disengaged position, the low pressure starter-generator 138 is operated in the motor mode, and the high pressure starter-generator is deenergized. In this configuration, the interconnection gear assembly 208 is coupled to the high pressure input shaft 203 and, when the low pressure starter-generator 138 begins rotating, the overrunning sprag clutch 206 overruns. Thus, the low pressure starter-generator 138 drives the high pressure turbine 126, via interconnection gear assembly 208, the second power take-off assembly 146, and the high pressure spool 134, until the engine 100 is started. It is noted that the low pressure starter-generator 138 would typically be used to start the engine 100 if the high pressure starter-generator is inoperable. Thus, after the engine 100 has started, the previously described normal engine operation is implemented, with the exception that the decoupler 214 will remain in the disengaged position and the high pressure starter generator 142 will remain deenergized.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A multi-spool gas turbine engine, comprising:
    a gas turbine engine including at least a high pressure turbine and a low pressure turbine, each turbine adapted to receive a flow of combusted gas and operable, upon receipt thereof, to generate rotational energy;
    a high pressure starter-generator coupled to the high pressure turbine and configured to selectively operate in either (i) a generator mode, in which at least a portion of the rotational energy generated by the high pressure turbine is converted to electrical energy or (ii) a motor mode, in which electrical energy is converted to rotational energy and supplied to the high pressure turbine;
    a first clutch assembly movable between an engaged position and a disengaged position;
    a multi-speed gear assembly coupled to the low pressure turbine and to the first clutch assembly, the multi-speed gear assembly operable, upon receipt of the rotational energy and in dependence on the position of the first clutch assembly, to supply a rotational drive force at a rotational speed that varies over one of a plurality of rotational speed ranges;
    a low pressure starter-generator coupled to the multi-speed gear assembly and configured to selectively operate in either (i) a generator mode, in which the rotational drive force supplied from the multi-speed gear assembly is converted to electrical energy or (ii) a motor mode, in which electrical energy is converted to rotational energy; and
    a second clutch assembly movable between (i) an engaged position, in which the low pressure starter-generator is coupled to the high pressure turbine, and (ii) a disengaged position, in which the low pressure starter-generator is decoupled from the high pressure turbine.

2. The engine of claim 1, further comprising:
    an interconnection gear assembly including at least in input gear coupled to the low pressure starter-generator and an output gear coupled to the high pressure turbine, the output gear coupled to the high pressure turbine when the second clutch assembly is in the engaged position.

3. The engine of claim 2, wherein the interconnection gear assembly further comprises an idler gear disposed between the input gear and the output gear.

4. The engine of claim 1, further comprising:
    a speed changer coupled between the multi-speed gear assembly and the low pressure starter-generator, the speed changer configured to change the rotational speed of the drive force supplied from the multi-speed gear assembly.

5. The engine of claim 1, wherein:
    the first and second clutch assemblies are each responsive to clutch actuation commands to move between the engaged and disengaged positions; and
    the engine further comprises a control circuit operable to selectively supply first and second clutch actuation commands to the first and second clutch assemblies, respectively.

6. The engine of claim 5, wherein:
    the first clutch assembly includes a first clutch actuator coupled to the first clutch assembly, the first clutch actuator coupled to receive the clutch actuation commands from the control circuit and operable, upon receipt thereof, to selectively move the first clutch between the engaged and disengaged position; and
    the second clutch assembly includes a second clutch actuator coupled to the second clutch assembly, the second clutch actuator coupled to receive the clutch actuation commands from the control circuit and operable, upon receipt thereof, to selectively move the second clutch between the engaged and disengaged position.

7. The engine of claim 1, further comprising:
    a decoupler coupled between the high pressure starter-generator and the high pressure turbine and movable between (i) an engaged position, in which the high pressure starter-generator is coupled to the high pressure turbine, and (ii) a disengaged position, in which the high pressure starter generator is decoupled from the high pressure turbine.

8. The engine of claim 7, wherein:
    the first and second clutch assemblies are each responsive to clutch actuation commands to move between the engaged and disengaged positions;
    the decoupler is responsive to decoupler actuation commands to move from the engaged position to the disengaged positions; and
    the engine further comprises a control circuit operable to selectively supply the clutch actuation commands to each of the clutch assemblies, and the decoupler actuation commands to the decoupler.

9. The engine of claim 8, wherein:
    the first clutch assembly includes a first clutch actuator coupled to receive the clutch actuation commands from the control circuit and operable, upon receipt thereof, to selectively move the first clutch between the engaged and disengaged position;
    the second clutch assembly includes a second clutch actuator coupled to receive the clutch actuation commands from the control circuit and operable, upon receipt thereof, to selectively move the second clutch between the engaged and disengaged position; and
    the decoupler includes a decoupler actuator coupled to receive the decoupler actuation commands from the control circuit and operable, upon receipt thereof, to selectively move the decoupler from the engaged to the disengaged position.

10. The engine of claim 1, further comprising:
    an overrunning sprag clutch assembly coupled between the low pressure starter-generator and the multi-speed gear assembly, the overrunning sprag clutch configured to (i) couple the low pressure starter-generator to the multi-speed gear assembly when the low pressure starter-generator is operating in the generate mode and (ii) decouple the low pressure starter-generator from the multi-speed gear assembly when the low pressure starter-generator is operating in the motor mode.

11. The engine of claim 1, wherein the multi-speed gear assembly comprises a planetary gear assembly including, a sun gear, a ring gear, and a carrier.

12. The engine of claim 11, wherein:
the sun gear is locked to the carrier and rotates therewith when the first clutch assembly is in the engaged position; and
the sun gear is not locked to the carrier and is prevented from rotating when the first clutch assembly is in the disengaged position.

13. The engine of claim 12, further comprising:
a sprag clutch coupled between the multi-speed gear assembly and the low pressure starter-generator, the sprag clutch configured to prevent the sun gear from rotating when the first clutch assembly is in the disengaged position.

14. The engine of claim 1, wherein the plurality of rotational speed ranges is two rotational speed ranges.

15. A multi-spool gas turbine engine, comprising:
a gas turbine engine including at least a high pressure turbine and a low pressure turbine, each turbine adapted to receive a flow of combusted gas and operable, upon receipt thereof, to generate rotational energy;
a high pressure starter-generator coupled to the high pressure turbine and configured to selectively operate in either (i) a generator mode, in which at least a portion of the rotational energy generated by the high pressure turbine is converted to electrical energy or (ii) a motor mode, in which electrical energy is converted to rotational energy and supplied to the high pressure turbine;
a first clutch assembly movable between an engaged position and a disengaged position;
a multi-speed gear assembly coupled to the low pressure turbine and to the first clutch assembly, the multi-speed gear assembly operable, upon receipt of the rotational energy and in dependence on the position of the first clutch assembly, to supply a rotational drive force at a rotational speed that varies over one of a plurality of rotational speed ranges;
a low pressure starter-generator coupled to the multi-speed gear assembly and configured to selectively operate in either (i) a generator mode, in which the rotational drive force supplied from the multi-speed gear assembly is converted to electrical energy or (ii) a motor mode, in which electrical energy is converted to rotational energy;
a second clutch assembly movable between (i) an engaged position, in which the low pressure starter-generator is coupled to the high pressure turbine, and (ii) a disengaged position, in which the low pressure starter-generator is decoupled from the high pressure turbine; and
an interconnection gear assembly including at least in input gear coupled to the low pressure starter-generator and an output gear coupled to the high pressure turbine, the output gear coupled to the high pressure turbine when the second clutch assembly is in the engaged position.

16. The engine of claim 15, further comprising:
a speed changer coupled between the multi-speed gear assembly and the low pressure starter-generator, the speed changer configured to change the rotational speed of the drive force supplied from the multi-speed gear assembly.

17. The engine of claim 15, further comprising:
an overrunning sprag clutch assembly coupled between the low pressure starter-generator and the multi-speed gear assembly, the overrunning sprag clutch configured to (i) couple the low pressure starter-generator to the multi-speed gear assembly when the low pressure starter-generator is operating in the generate mode and (ii) decouple the low pressure starter-generator from the multi-speed gear assembly when the low pressure starter-generator is operating in the motor mode.

18. The engine of claim 15, further comprising:
a decoupler coupled between the high pressure starter-generator and the high pressure turbine and movable between (i) an engaged position, in which the high pressure starter-generator is coupled to the high pressure turbine, and (ii) a disengaged position, in which the high pressure starter generator is decoupled from the high pressure turbine.

19. The engine of claim 18, wherein:
the first and second clutch assemblies are each responsive to clutch actuation commands to move between the engaged and disengaged positions;
the decoupler is responsive to decoupler actuation commands to move from the engaged to the disengaged position; and
the engine further comprises a control circuit operable to selectively supply the clutch actuation commands to each of the clutch assemblies, and the decoupler actuation commands to the decoupler.

20. A multi-spool gas turbine engine, comprising:
a gas turbine engine including at least a high pressure turbine and a low pressure turbine, each turbine adapted to receive a flow of combusted gas and operable, upon receipt thereof, to generate rotational energy;
a high pressure starter-generator coupled to the high pressure turbine and configured to selectively operate in either (i) a generator mode, in which at least a portion of the rotational energy generated by the high pressure turbine is converted to electrical energy or (ii) a motor mode, in which electrical energy is converted to rotational energy and supplied to the high pressure turbine;
a first clutch assembly movable between an engaged position and a disengaged position;
a multi-speed gear assembly coupled to the low pressure turbine and to the first clutch assembly, the multi-speed gear assembly operable, upon receipt of the rotational energy and in dependence on the position of the first clutch assembly, to supply a rotational drive force at a rotational speed that varies over one of a plurality of rotational speed ranges;
a low pressure starter-generator coupled to the multi-speed gear assembly and configured to selectively operate in either (i) a generator mode, in which the rotational drive force supplied from the multi-speed gear assembly is converted to electrical energy or (ii) a motor mode, in which electrical energy is converted to rotational energy;
a speed changer coupled between the multi-speed gear assembly and the low pressure starter-generator, the speed changer configured to change the rotational speed of the drive force supplied from the multi-speed gear assembly;
a second clutch assembly movable between (i) an engaged position, in which the low pressure starter-generator is coupled to the high pressure turbine, and (ii) a disengaged position, in which the low pressure starter-generator is decoupled from the high pressure turbine;

an interconnection gear assembly including at least in input gear coupled to the low pressure starter-generator and an output gear coupled to the high pressure turbine, the output gear coupled to the high pressure turbine when the second clutch assembly is in the engaged position;

an overrunning sprag clutch assembly coupled between the low pressure starter-generator and the multi-speed gear assembly, the overrunning sprag clutch configured to (i) couple the low pressure starter-generator to the multi-speed gear assembly when the low pressure starter-generator is operating in the generate mode and (ii) decouple the low pressure starter-generator from the multi-speed gear assembly when the low pressure starter-generator is operating in the motor mode; and a decoupler coupled between the high pressure starter-generator and the high pressure turbine and movable between (i) an engaged position, in which the high pressure starter-generator is coupled to the high pressure turbine, and (ii) a disengaged position, in which the high pressure starter generator is decoupled from the high pressure turbine.

* * * * *

UNITED STATES PATENT AND TRADEMARK OFFICE
CERTIFICATE OF CORRECTION

PATENT NO. : 7,481,062 B2 Page 1 of 1
APPLICATION NO. : 11/323692
DATED : January 27, 2009
INVENTOR(S) : Louie T. Gaines et al.

It is certified that error appears in the above-identified patent and that said Letters Patent is hereby corrected as shown below:

Column 9, line 60, "in" should be changed to --an--;
Column 11, line 57, "in" should be changed to --an--;
Column 13, line 1, "in" should be changed to --an--.

Signed and Sealed this

Sixteenth Day of June, 2009

JOHN DOLL
*Acting Director of the United States Patent and Trademark Office*